(12) United States Patent
Tsuchiya et al.

(10) Patent No.: US 11,648,499 B2
(45) Date of Patent: May 16, 2023

(54) DUST FILTER

(71) Applicant: AISAN KOGYO KABUSHIKI KAISHA, Obu (JP)

(72) Inventors: Takumi Tsuchiya, Ichinomiya (JP); Norihiro Kondo, Toyota (JP); Tsuneyuki Kurata, Okazaki (JP)

(73) Assignee: Aisan Kogyo Kabushiki Kaisha

( * ) Notice: Subject to any disclaimer, the term of this patent is extended or adjusted under 35 U.S.C. 154(b) by 64 days.

(21) Appl. No.: 17/353,429

(22) Filed: Jun. 21, 2021

(65) Prior Publication Data
US 2022/0001318 A1 Jan. 6, 2022

(30) Foreign Application Priority Data

Jul. 3, 2020 (JP) .............................. JP2020-115446

(51) Int. Cl.
*B01D 46/00* (2022.01)
*B01D 46/52* (2006.01)
(Continued)

(52) U.S. Cl.
CPC ..... *B01D 46/0031* (2013.01); *B01D 39/1676* (2013.01); *B01D 45/08* (2013.01); *B01D 46/0005* (2013.01); *B01D 46/521* (2013.01); *B01D 50/20* (2022.01); *B01D 53/04* (2013.01); *B01D 2253/102* (2013.01); *B01D 2257/702* (2013.01); *B01D 2259/4516* (2013.01); *B01D 2259/4566* (2013.01); *B01D 2273/28* (2013.01); *B01D 2279/60* (2013.01); *F02M 25/0854* (2013.01)

(58) Field of Classification Search
CPC ................ B01D 46/0031; B01D 45/08; B01D 46/0005; B01D 50/20; B01D 2259/4516; B01D 46/103; F02M 35/042; F02M 35/0201; F02M 35/088
See application file for complete search history.

(56) References Cited

U.S. PATENT DOCUMENTS 5,638,786 A * 6/1997 Gimby ............... F02M 25/0872
55/296
5,912,368 A * 6/1999 Satarino ................. B01D 46/30
55/444

(Continued)

FOREIGN PATENT DOCUMENTS

CN 102926898 B * 8/2015
DE 102011078787 A1 * 1/2012 ......... B01D 46/2411

(Continued)

*Primary Examiner* — Hung Q Nguyen
(74) *Attorney, Agent, or Firm* — Conley Rose, P.C.

(57) ABSTRACT

A dust filter is configured to filter air drawn into a vehicle canister. The dust filter includes a filtration member and a case. The case has an inner chamber for accommodating the filtration member. The case has a drainage port for draining liquid that has infiltrated the inner chamber. The drainage port is at least one opening formed at the bottom of the inner chamber. The case includes a cover that covers the drainage port. The cover has an outlet that opens to the outside. The outlet is lower than the drainage port. At least one baffle plate is disposed inside the cover. The baffle plate has a slope on the side of the baffle plate facing the drainage port, thereby forming a ramp.

3 Claims, 8 Drawing Sheets

(51) Int. Cl.
*B01D 39/16* (2006.01)
*B01D 45/08* (2006.01)
*B01D 50/20* (2022.01)
F02M 25/08 (2006.01)
B01D 53/04 (2006.01)

(56) References Cited

U.S. PATENT DOCUMENTS

| | | | |
|---|---|---|---|
| 6,599,350 B1 * | 7/2003 | Rockwell | F02M 25/0854 |
| | | | 96/135 |
| 7,849,838 B2 | 12/2010 | Ohhira et al. | |
| 7,981,180 B2 * | 7/2011 | Yamamoto | B01D 46/521 |
| | | | 55/497 |
| 2010/0005764 A1 * | 1/2010 | Yamamoto | B01D 46/103 |
| | | | 55/424 |
| 2010/0293905 A1 * | 11/2010 | Lin | F02M 35/10222 |
| | | | 55/325 |

FOREIGN PATENT DOCUMENTS

| | | | |
|---|---|---|---|
| JP | 2009156032 A | | 7/2009 |
| JP | 2009197594 A | * | 9/2009 |
| JP | 2010130965 A | | 6/2010 |
| JP | 2011256760 A | | 12/2011 |
| JP | 2015071354 A | | 4/2015 |
| JP | 2018114872 A | * | 7/2018 |

* cited by examiner

DUST FILTER

CROSS-REFERENCE TO RELATED APPLICATIONS

This application claims priority to Japanese patent application serial number 2020-115446 filed Jul. 3, 2020, which is hereby incorporated herein by reference in its entirety for all purposes.

BACKGROUND

The present disclosure relates generally to dust filters. More specifically, the present disclosure relates to dust filters that filter air drawn into canisters mounted to vehicles.

Vehicles equipped with an engine, such as automobiles, are provided with a canister that captures evaporated fuel generated in a fuel tank. The canister communicates with the atmosphere via an atmospheric passage. The atmospheric passage is provided with a dust filter that filters air drawn into the canister during purging. In some dust filters, a case accommodating a filtration member disposed therein includes an atmospheric port for the intake of air. In addition, the case often includes a drainage port for draining water from the bottom thereof. Further, a gutter-shaped drainage guide, which projects diagonally downward from the case, is provided at a drainage groove. Thus, for example, even if water enters into the case of the dust filter via the atmospheric port during rain or a car wash, the water is guided to the outside along the drainage guide to the drainage port at the bottom. Accordingly, the water does not accumulate in the case.

SUMMARY

One embodiment of the present disclosure is a dust filter that filters air drawn into a vehicle canister. The dust filter may include a filtration member and a case. The case may have an inner chamber for accommodating the filtration member. The case may have a drainage port for draining liquid that has infiltrated the inner chamber. The drainage port may be at least one opening in the case positioned at the bottom of the inner chamber. The case may include a cover that covers the drainage port. The cover may have an outlet that opens to the outside. The outlet may be lower than the drainage port. At least one baffle plate may be disposed inside the cover. The baffle plate may have a slope on the side of the drainage port, thereby forming a ramp. As a result, it is possible to suppress the infiltration of water from the drainage port, while also ensuring smooth drainage performance of the dust filter.

According to another embodiment of the present disclosure, the baffle plate may be formed of multiple baffle plates. Each opening and the outlet may be disposed so as not to be in directly fluid communication in a linear fashion. Accordingly, the path of water entering linearly via the outlet of the cover may be reliably obstructed.

DETAILED DESCRIPTION

In the dust filter described in Japanese Patent Application Laid-Open No. 2011-256760, there is a possibility that water splashed when the vehicle travels through a puddle may infiltrate the case of the dust filter through the drainage guide. Further, the same thing may occur when washing the lower part of the vehicle body with a pressure washer. If the water level inside the case rises due to a large amount of water flowing into the case through the drainage guide, the filtration member disposed in the case may be infiltrated by the water and its function may be undesirably impaired. Therefore, it is desired to suppress the infiltration of water into the case via the drainage port, while still ensuring adequate drainage performance of the drainage port.

Figure 1:
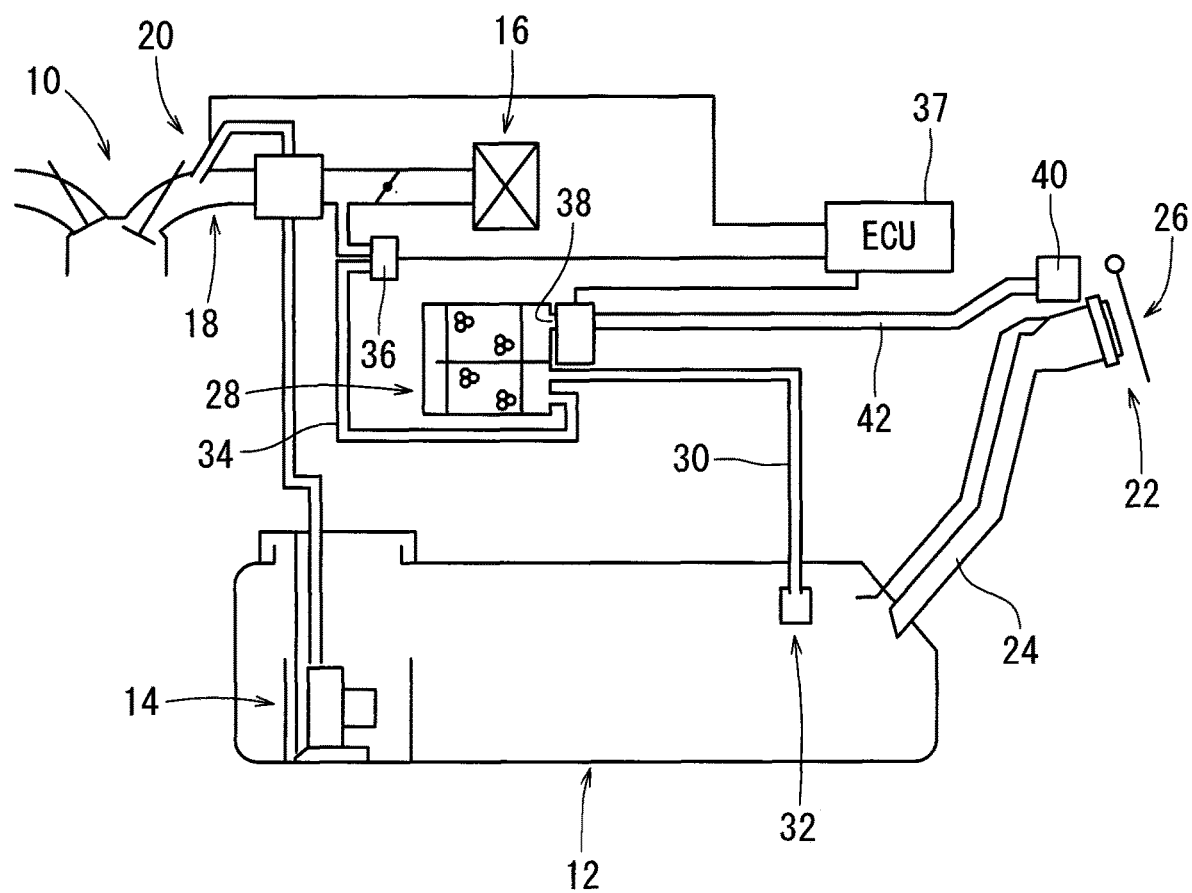
FIG. 1 is a schematic view of an embodiment of a fuel system of an automobile in accordance with the principles described herein.

Hereinafter, various embodiments of the present disclosure will be described with reference to the drawings. Parts that do not have a substantial difference between the embodiments are designated by similar reference numerals to avoid repeating the description. Referring now to FIG. 1, a fuel system for a vehicle such as automobile is shown. The fuel system includes an engine 10 and a fuel tank 12 for storing the fuel burned by the engine 10. The engine 10 intakes air cleaned by an air cleaner 16 mounted to an intake pipe 18. A pump module 14 is disposed within the fuel tank 12. Fuel delivered by the pump module 14 is injected from an injector 20 into the intake pipe 18. An inlet pipe 24, which guides fuel supplied from a fuel filler port 22 into the fuel tank 12, is connected to the fuel tank 12. The fuel filler port 22 can be selectively closed by a cap 26. The inlet pipe 24 extends obliquely upward from the fuel tank 12 to the fuel filler port 22.

As shown in FIG. 1, the fuel system includes a canister 28 configured to capture evaporated fuel generated in the fuel tank 12 and prevent it from being released into the atmosphere. An adsorption layer, which is made of, for example, activated carbon, is provided in the canister 28. The canister 28 is in fluid communication with the fuel tank 12 via a tank-side passage 30. The adsorption layer in the canister 28 adsorb the evaporated fuel flowing from the tank side passage 30. An Onboard Refueling Vapor Recovery valve (ORVR valve) 32, which is made of, for example, a float valve, is provided in the fuel tank 12. The evaporated fuel that passes through the ORVR valve 32 is sent to the canister 28.

The canister 28 is in selective fluid communication with the intake pipe 18 of the engine 10 via a purge passage 34. A purge control valve 36 is provided along the purge passage 34. The purge control valve 36 is controlled to open and close according to the operating state of the engine 10, for example by an electronic control unit (ECU) 37. When the purge control valve 36 is open, the intake negative pressure of the engine 10 acts on the canister 28 via the purge passage 34. Therefore, the evaporated fuel adsorbed on the adsorption layer in the canister 28 can be desorbed. Then, the evaporated fuel may be introduced into the engine 10, together with the intake air flowing through the intake pipe 18. As a result, the evaporated fuel may be burned by the engine 10.

The canister 28 may have an atmospheric port 38 in fluid communication with the atmosphere. During the purging operation of the canister 28, air (purge air) is introduced into the canister 28 from the atmosphere via the atmospheric port 38. In addition to the purging operation, negative pressure may be applied to the fuel tank 12 due to, for example, fuel consumption or a temperature drop. On the contrary, positive pressure may be applied to the fuel tank 12 when evaporated fuel is generated due to a temperature rise, fuel fluctuation, or the like. The pressure fluctuation in the fuel tank 12 may be mitigated by introducing air into the canister 28 via the atmospheric port 38 and by releasing air from the canister 28 into the atmosphere via the atmospheric port 38.

Figure 2:
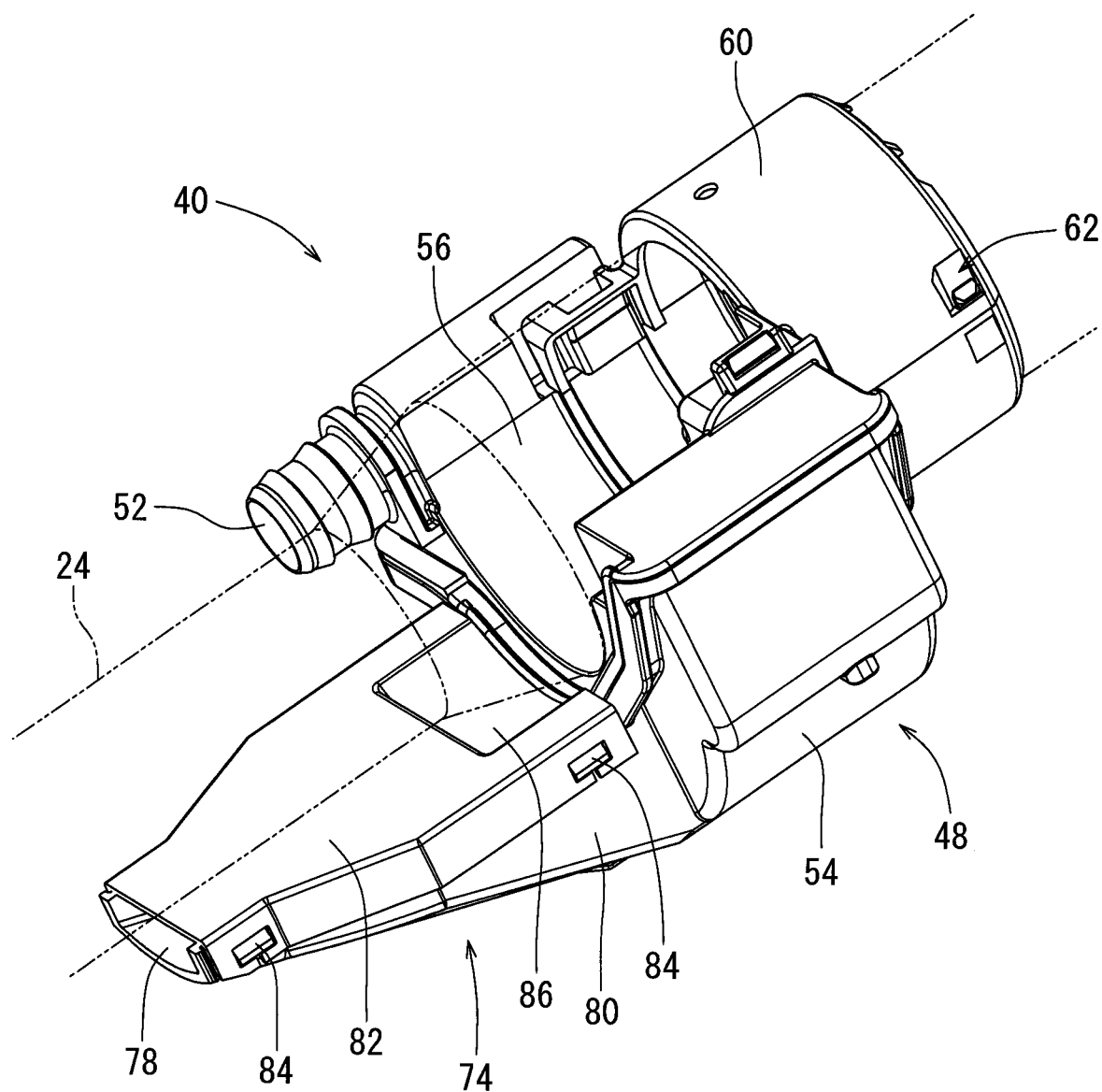
FIG. 2 is an enlarged perspective view of the dust filter of FIG. 1 attached to the inlet pipe of FIG. 1 (the outer profile of the inlet pipe is illustrated with a two-dot-chain line).
Figure 3:
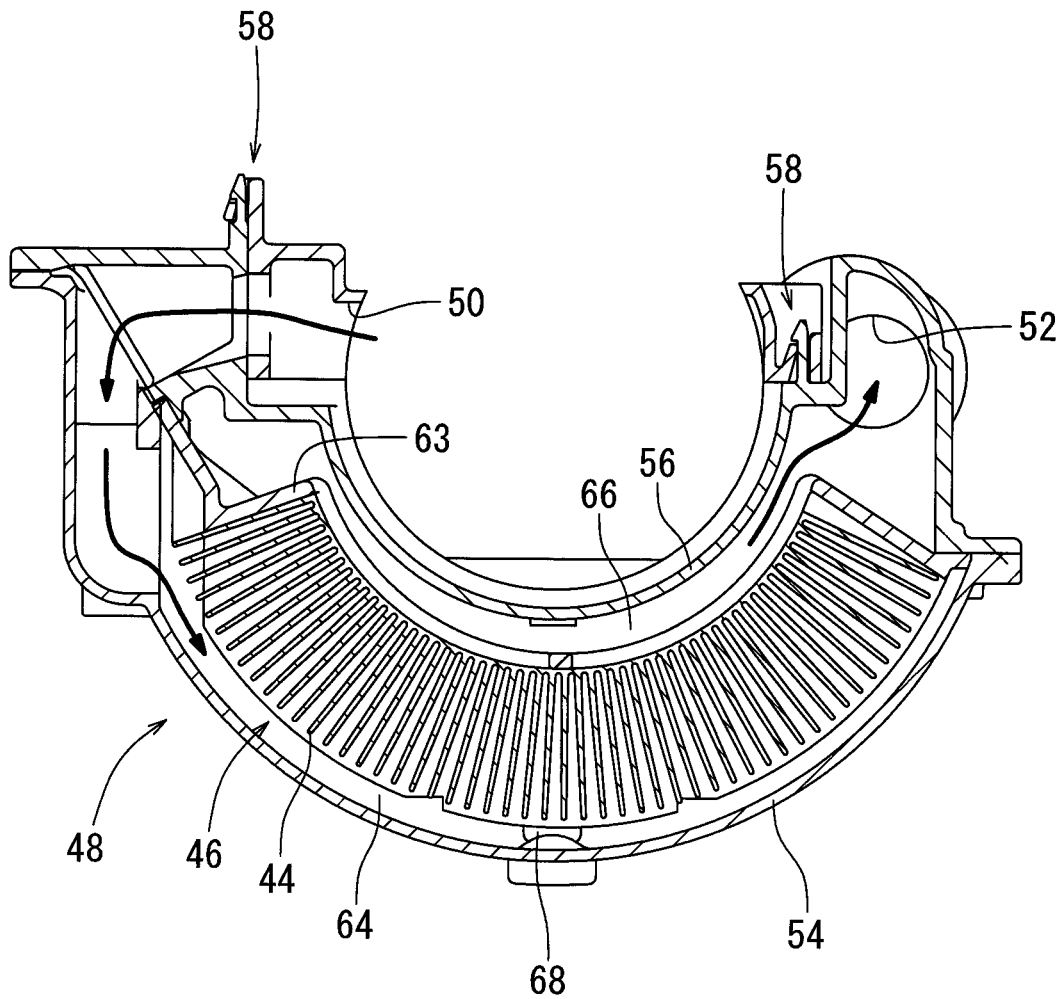
FIG. 3 is a cross-sectional view of the dust filter of FIG. 2 taken in a plane oriented orthogonal to the inlet pipe and schematically illustrating a flow path of air drawn into the dust filter with arrows.

As shown in FIGS. 2 and 3, the fuel system is provided with a dust filter 40 (air filter) for removing foreign matter, such as dust, from the air drawn into the canister 28. The dust filter 40 is in fluid communication with the canister 28 via a connecting passage 42. The connecting passage 42 may comprise, for example, pipes and hoses (see FIG. 1). The dust filter 40 includes a filtration member 44 and a case 48. The case 48 includes an inner chamber 46 for accommodating the filtration member 44. The case 48 may be made of, for example, resin. The air, which is drawn through the connecting passage 42 when a purging operation is being performed on the canister 28, is filtered by the dust filter 40. Such filtration removes foreign matter, such as dust. The case 48 includes an atmospheric port 50 and a canister-side port 52. The atmospheric port 50 is open to the atmosphere for the intake of air. The canister-side port 52 is connected to the canister 28.

The dust filter 40 may be disposed, for example, near the fuel filler port 22 of the inlet pipe 24. In this embodiment, the case 48 is formed in a substantially semi-cylindrical shape such that it can be mounted to the outside of the inlet pipe 24. When the dust filter 40 is mounted on the inclined portion of the inlet pipe 24, the dust filter 40 may be also be oriented in an inclined posture. The case 48 includes a lower member 54 and an upper member 56 coupled to the lower member 54. The lower member 54 may be attached to the upper case with an appropriate assembly mechanism, such as a snap-fit mechanism 58.

The dust filter 40 may be attached to the inlet pipe 24 with an appropriate holding member 60 having, for example, a semi-cylindrical shape. In particular, the dust filter 40 may be attached by holding the inlet pipe 24 between the holding member 60 and the case 48. The holding member 60 may be attached to the case 48 with an appropriate assembly mechanism, such as a snap-fit mechanism 62. The atmospheric port 50 may be disposed, for example, on the inner peripheral side of the case 48. An appropriate gap may be provided between the atmospheric port 50 and the surface of the inlet pipe 24 to allow the flow of air therebetween.

The filtration member 44 may be, for example, a filter paper folded in a ribbed state. The filtration member 44 is disposed in the inner chamber 46 and held in position with a holding member 63. In another embodiment, the filtration member 44 may be a block made of a urethane foam resin. When the filtration member 44 is properly disposed in the case 48, the filtration member 44 divides the inner chamber 46 into an atmospheric-side space 64, which is on the lower side, and a canister-side space 66, which is on the upper side.

When the connecting passage 42 is subject to a negative pressure, air may flow from the atmosphere into the case 48, via the atmospheric port 50. Inside the case 48, the air may flow from the atmospheric-side space 64 to the canister-side space 66, passing through the filtration member 44. At this time, dust may be captured by the filtration member 44. The purified air may be introduced into the canister 28, from the canister-side space 66 via the connecting passage 42.

Figure 4:
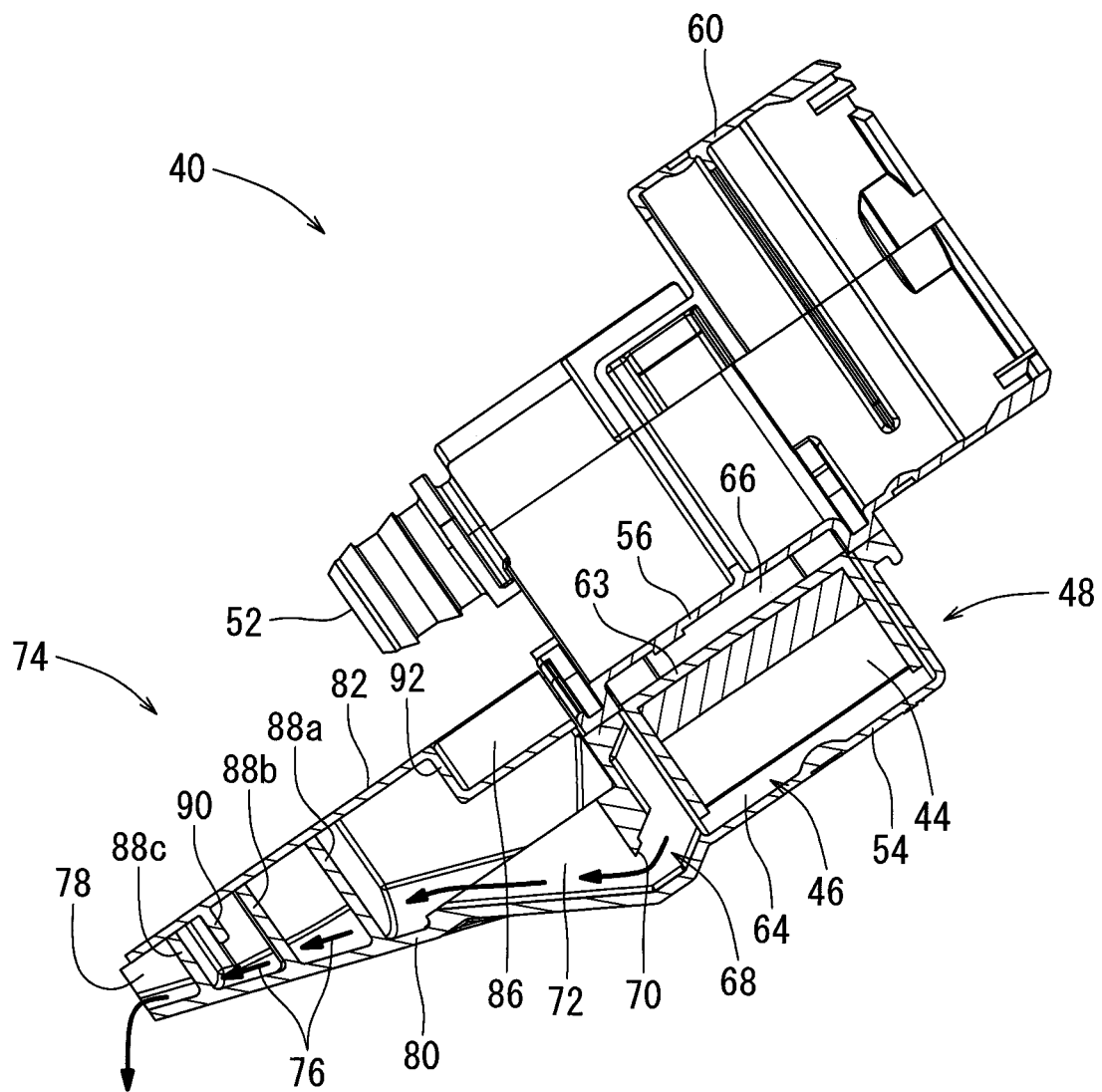
FIG. 4 is a cross-sectional view of the dust filter of FIG. 2 taken in a plane oriented parallel to the inlet pipe and schematically illustrating a drainage channel formed by a baffle plate in the cover with arrows.
Figure 5:
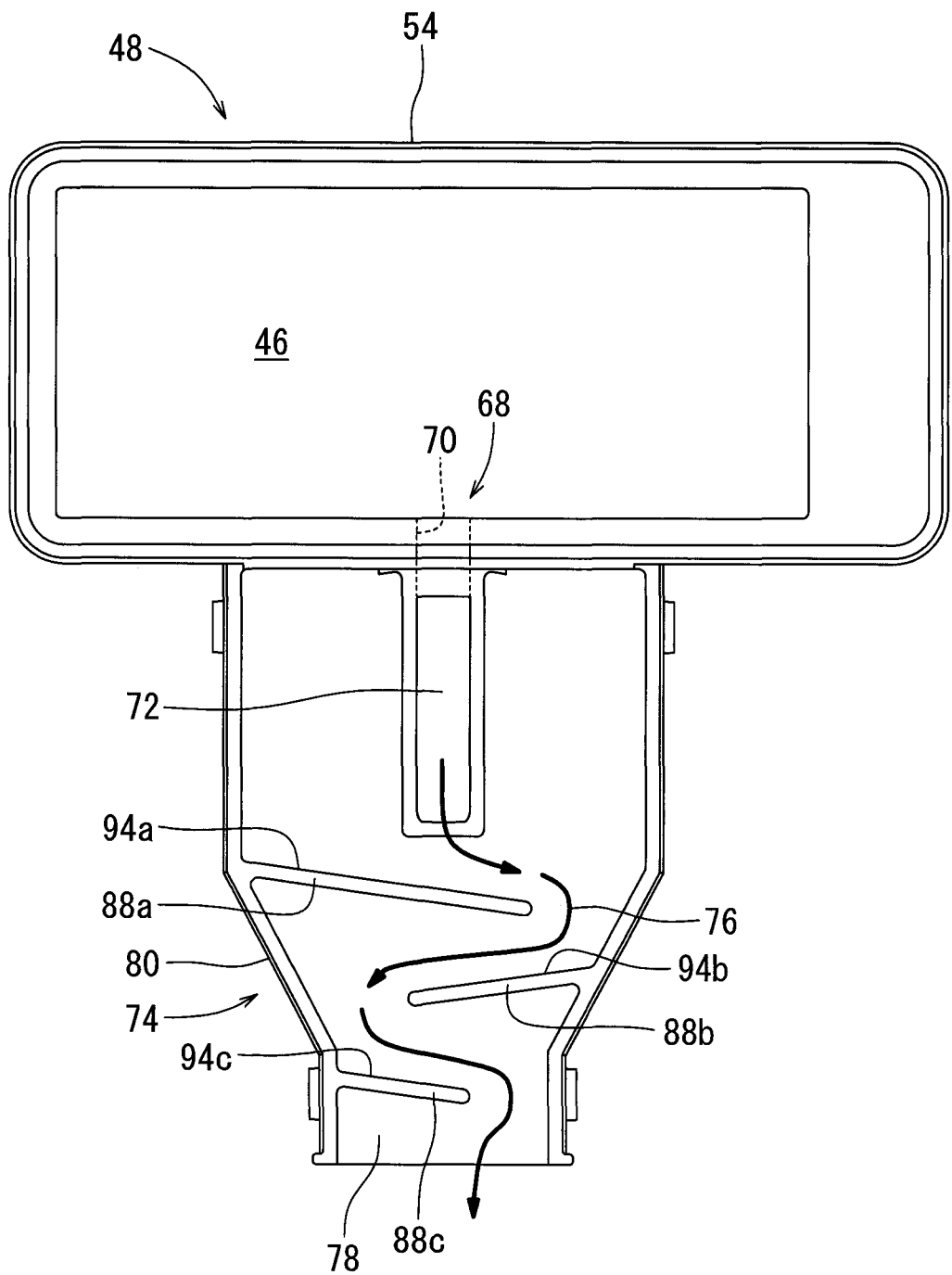
FIG. 5 is a cross-sectional view of another embodiment of a baffle plate.

As shown in FIGS. 3 to 5, a drainage port 68 is provided at the bottom of the case 48. The drainage port 68 is positioned and configured to discharge a liquid, such as water, that has infiltrated the case 48. The drainage port 68 is positioned on the atmospheric side of the case 48 with respect to the filtration member 44. For instance, the drainage port 68 is at a position so that it is in direct fluid communication with the atmospheric-side space 64 of the inner chamber 46 within the case 48. In a state where the dust filter 40 is fixed to the inlet pipe 24, the drainage port 68 may be located at or near the lowest portion of the atmospheric-side space 64 inside the case 48 relative to the direction of gravity. When it rains or when the car is washed, water, together with air, may infiltrate the case 48 via the atmospheric port 50. However, the water that infiltrates the case 48 may be discharged to the outside of the case 48 via the drainage port 68. This is facilitated by the drainage port 86 being located at the bottom of the atmospheric-side space 64. Therefore, it is possible to prevent water from accumulating at the bottom of the inner chamber 46 of the case 48. This may also help prevent deterioration of the filtration performance of the dust filter 40. The drainage port 68 may be, for example, at least one opening 70 that is opened at the bottom surface of the case 48.

A guide passage 72 extends diagonally downward from the opening 70 and the case 48. The guide passage 72 comprises a structure capable of being easily closed for an air leakage inspection of the case 48 of the dust filter 40. For example, the guide passage 72 may have such a structure that corresponds to cutting off a tip in a flat surface.

As shown in FIGS. 2, 4, and 5, the dust filter 40 includes a cover 74 configured to cover the drainage port 68, so as to prevent water from entering the case 48. In this embodiment, the cover 74 is a hollow member having a drainage channel 76 formed therein. The cover 74 has an outlet 78 configured to open to the outside. The outlet 78 is positioned lower than the drainage port 68 relative to the direction of gravity. Water that has infiltrated the case 48 is discharged from the drainage port 68 into the cover 74. Then, the water may travel through the drainage channel 76 and fall to the outside through the outlet 78. The drainage channel 76 is shaped to define a tortuous path so that the opening 70 (or each opening if there is a plurality of openings), which forms the drainage port 68 of the case 48, and the outlet 78 are not in direct linear fluid communication with each other. As a result, the length of the drainage channel 76 may become longer than a straight-line distance from the opening 70 to the outlet 78. Such a shape of the drainage channel 76 may be, for example, a labyrinth shape. Due to the shape of the drainage channel 76, for example, even if a jet of water or a cleaning liquid enters the drainage channel 76 via the outlet 78 when the vehicle is washed with a pressure washer, the influence of the jet of water may be weakened by the drainage channel 76. This weakening may prevent the jet of water from reaching the drainage port 68. The drainage channel 76 may have a branch and/or a convergence.

As shown in FIGS. 2, 4, 5, and 8, the cover 74 may be completely or partially integrally molded with the case 48. For example, the cover 74 may be composed of a lower member 80 and an upper member (lid member) 82. In some embodiments, only the lower member 80 may be integrally molded with the case 48. Although not shown, the cover 74 may be formed as a completely separate body and may be attached to the case 48 by an appropriate mechanism. Even if the cover 74 is a separate body, the cover 74 may be similarly composed of two members. The upper member 82 of the cover 74 may be attached to the lower member 80 by an appropriate mechanism, such as a snap-fit mechanism 84. By forming the cover 74 in a two-member structure, the desired drainage channel 76 may be more easily formed. If necessary, the upper member 82 may be provided with a recessed portion 86 configured to prevent interference between the cover 74 and surrounding member(s) (for example, a tapered portion of the inlet pipe 24).

Figure 6:
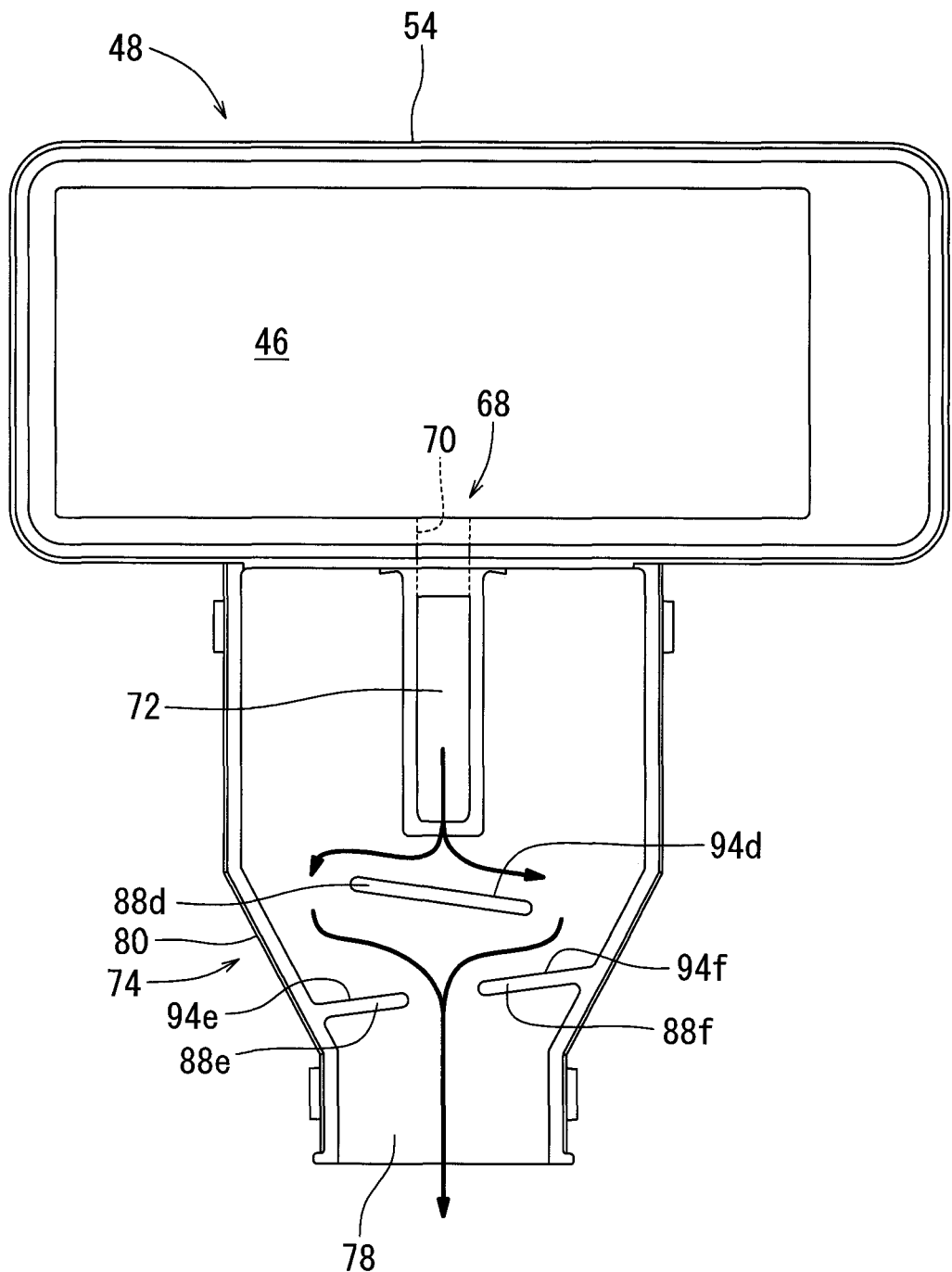
FIG. 6 is a cross-sectional view of another embodiment of a baffle plate.
Figure 7:
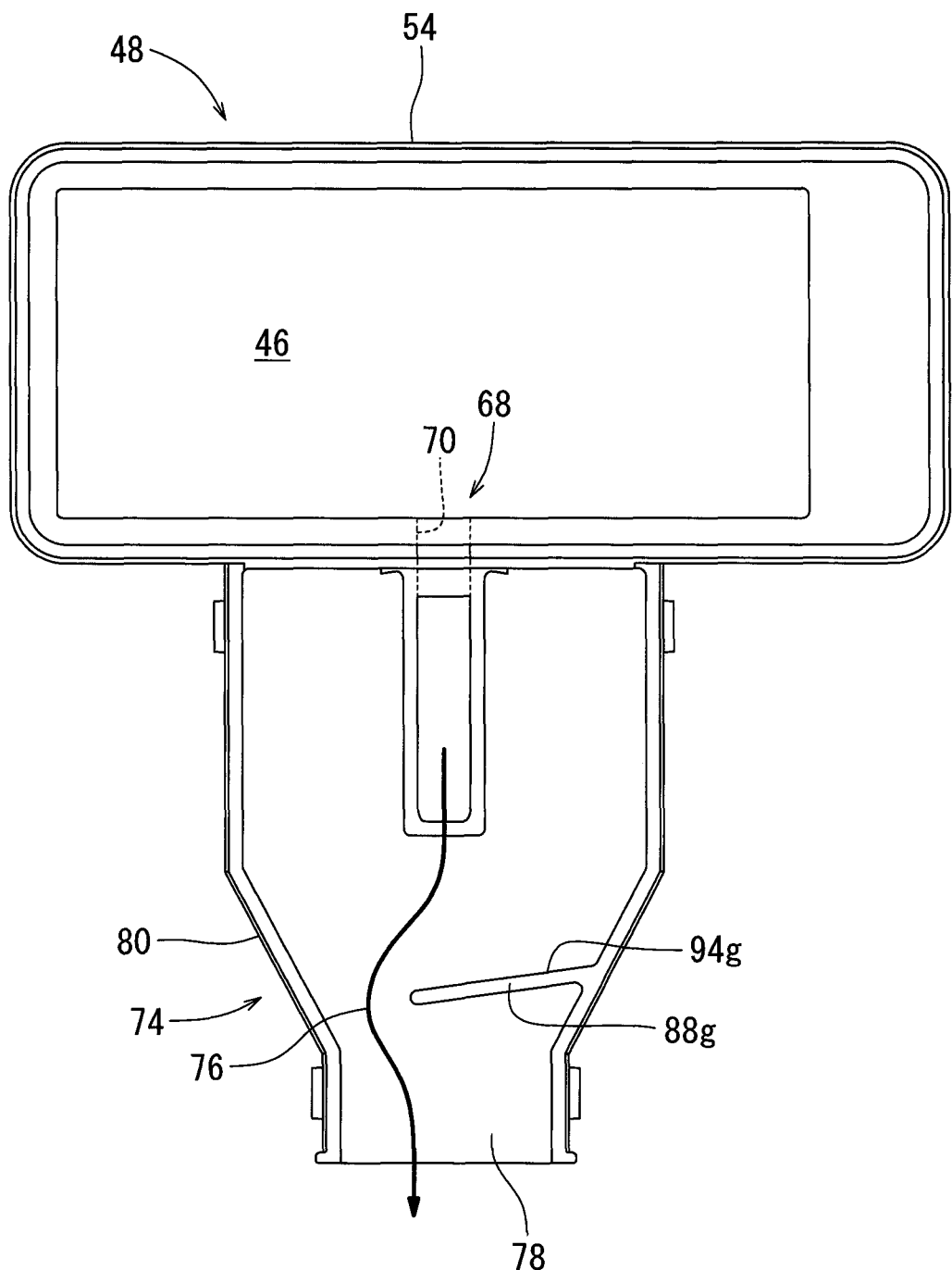
FIG. 7 is a top view of the lower member of FIG. 2 with the upper member of the cover removed.

As shown in FIGS. 4 and 5, the cover 74 is internally provided with one or more baffle plate(s). The one or more baffle plate(s) are configured to interrupt a straight line connecting the opening 70 and the outlet 78 as best shown in FIG. 5. In this embodiment, three baffle plates 88a, 88b, and 88c are formed on the lower member 80 of the cover 74. The baffle plates 88a, 88b, 88c may aid in forming the drainage channel 76. The drainage channel 76 does not allow the opening 70 and the outlet 78 to directly communicate linearly, in part due to the positions and orientations of the baffle plates 88a, 88b, and 88c. More specifically, the drainage channel 76 in the cover 74 has a labyrinth shape defined, at least in part, by the baffle plates 88a, 88b, 88c. As shown in FIG. 6, in another embodiment, a baffle plate 88d that does not reach either of the side walls, for instance the left and right walls, of the cover 74 is provided. The baffle plate 88d is configured so that the drainage channel 76 may have a branch and/or a convergence. In another embodiment, two additional baffle plates 88e, 88f may be present. The two additional baffle plates 88e, 88f extend from the left or right walls of the cover 74. The baffle plates 88e, 88f may extend in directions toward each other. These three baffle plates 88d, 88e, 88f are positioned and oriented so that the opening 70 of the drainage port 68 and the outlet 78 do not directly communicate with each other in a linear fashion. As shown in FIG. 7, in yet another embodiment, only one baffle plate 88g is provided. In such an embodiment, the drainage channel 76 from the opening 70 of the drainage port 68 to a part of the outlet 78 (the left side portion in FIG. 7) may directly communicate with each other in a linear fashion.

Figure 8:
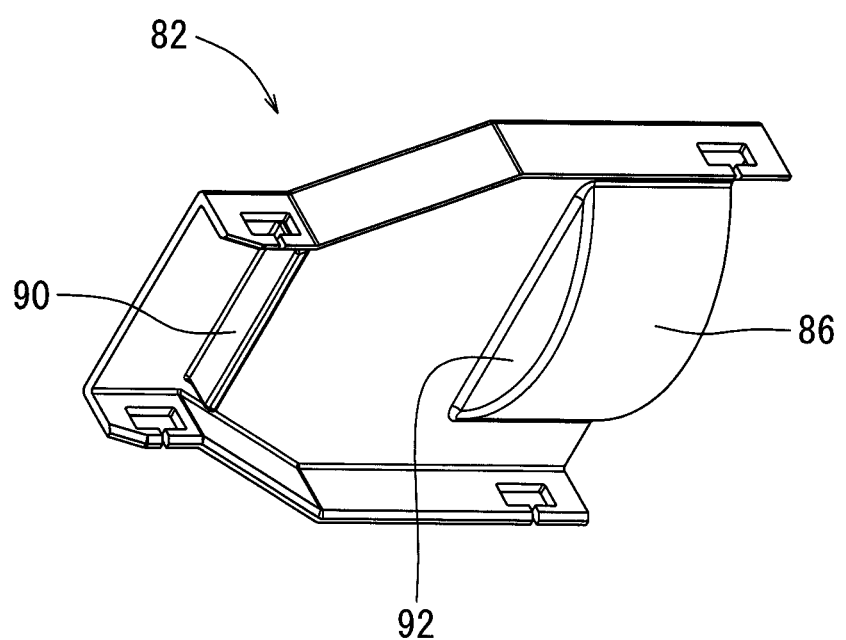
FIG. 8 is a perspective view of the upper member of FIG. 2.

As shown in FIGS. 4 and 8, a baffle plate 90 is provided on the upper member 82. The baffle plate 90 of the upper member 82 overlaps with the baffle plate 88c of the lower member 80 when the upper member 82 is attached to the lower member 80. Even if there is a clearance (not shown), which may aid in assembly, between the baffle plate 88c of the lower member 80 and the baffle plate 90 of the upper member 82, it is possible to suppress the influence of the water flow toward the drainage port 68, the water having entered via the outlet 78. For instance, if the water flow exceeds the upper side of the baffle plate 88c on the lower member 80, the presence of a baffle plate 90 of the upper member 82 may suppress the influence of the water flow. The baffle plate 90 may be disposed on the upper member 82 at a position closer to the drainage port 68 than the baffle plate 88c which is closest to the outlet 78. Further, the wall of the recessed portion 86 of the upper member 82 may also function as an additional baffle plate 92.

As shown in FIGS. 4 and 5, the cross-sectional area of the drainage channel 76 is larger than the cross-sectional area of the opening 70 of the drainage port 68. The opening 70 of the drainage port 68 defines a narrow portion. In embodiments including several openings 70, it is preferable to have the cross-sectional area of discharge channel 76 be larger than the total cross-sectional area of the openings 70. The air, which is drawn into the canister 28 through the dust filter 40 or discharged from the canister 28, may pass through the drainage port 68. Therefore, it is possible to suppress a decrease in ventilation resistance due to the cover 74, for instance, by designing the cross-sectional area of the drainage port 68 as described above.

As shown in FIGS. 5 to 7, the baffle plates 88a to 88g are oriented at slopes 94a to 94g, respectively, on the side of the drainage port 68, thereby forming ramps. The slopes 94a to 94g may be surfaces such that a line of intersection with the bottom surface of the case 48 is inclined to either side with respect to the horizontal. By forming ramps with the slopes 94a to 94g, the baffle plates 88a to 88g may further suppress the infiltration of water into the case 48 via the outlet 78. The slopes 94a to 94g may also allow the water from the drainage port 68 to more smoothly flow downward inside the cover 74.

The various examples described above in detail with reference to the attached drawings are intended to be representative of the present disclosure, and are thus non-limiting embodiments. The detailed description is intended to teach a person of skill in the art to make, use, and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved dust filter, and/or methods of making and using the same.

What is claimed is:

1. A dust filter configured to filter air drawn into a vehicle canister, the dust filter comprising:
    a filtration member; and
    a case, wherein the case comprises:
        an inner chamber within which the filtration member is disposed;
        a drainage port configured to drain liquid within the inner chamber, wherein the drainage port comprises one opening disposed at a bottom of the inner chamber; and
        a cover that covers the drainage port, wherein the cover has an outlet that opens to the outside, the outlet being positioned at a position lower than the drainage port,
            at least one baffle plate disposed inside the cover, wherein the baffle plate has a slope on a side of the baffle plate facing the drainage port, and wherein the slope of the baffle plate forms a ramp.

2. The dust filter of claim 1, wherein:
    the cover includes multiple baffle plates, and
    the opening and the outlet of the cover are positioned so as not to be in direct fluid communication in a linear fashion.

3. A dust filter configured to filter air drawn into a vehicle canister, the dust filter comprising:
    a filtration member; and
    a case, wherein the case comprises:
        an inner chamber within which the filtration member is disposed;
        a drainage port configured to drain liquid within the inner chamber, wherein the drainage port comprises at least one opening disposed at a bottom of the inner chamber and a guide passage extending from the case;
a cover that covers the drainage port, wherein the cover has an outlet that opens to the outside, the outlet being positioned at a position lower than the drainage port, and
at least one baffle plate disposed inside the cover, wherein the baffle plate has a slope on a side of the baffle plate facing the drainage port.

* * * * *